(12) United States Patent
Watanabe et al.

(10) Patent No.: US 8,304,974 B2
(45) Date of Patent: Nov. 6, 2012

(54) FLUORESCENT LAMP

(75) Inventors: Satoru Watanabe, Tokyo (JP); Kazuhiro Itoh, Tokyo (JP); Naomichi Miyakawa, Tokyo (JP); Kazunari Watanabe, Tokyo (JP); Setsuro Ito, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/956,005

(22) Filed: Nov. 30, 2010

(65) Prior Publication Data
US 2011/0068678 A1 Mar. 24, 2011

Related U.S. Application Data

(63) Continuation of application No. PCT/JP2009/059626, filed on May 26, 2009.

(30) Foreign Application Priority Data

May 30, 2008 (JP) .................. 2008-142911
Nov. 26, 2008 (JP) .................. 2008-300978
Apr. 6, 2009 (JP) .................. 2009-092082

(51) Int. Cl.
*H01J 1/62* (2006.01)
(52) U.S. Cl. ...................... 313/491; 313/486
(58) Field of Classification Search .......... 313/496, 313/607, 484–486, 491; 501/153
See application file for complete search history.

(56) References Cited

U.S. PATENT DOCUMENTS

| | | | |
|---|---|---|---|
| 2006/0132041 A1* | 6/2006 | Choi | 313/607 |
| 2006/0276326 A1* | 12/2006 | Hosono et al. | 501/153 |
| 2008/0252194 A1 | 10/2008 | Kuroiwa et al. | |
| 2008/0265774 A1 | 10/2008 | Webster et al. | |
| 2011/0278509 A1 | 11/2011 | Ito et al. | |
| 2012/0153805 A1 | 6/2012 | Watanabe et al. | |
| 2012/0153806 A1 | 6/2012 | Ito et al. | |

FOREIGN PATENT DOCUMENTS
EP 1 876 628 A1 1/2008
(Continued)

OTHER PUBLICATIONS
International Search Report issued Aug. 11, 2009, in PCT/JP09/059626 filed May 26, 2009.

(Continued)

*Primary Examiner* — Nimeshkumar Patel
*Assistant Examiner* — Mary Ellen Bowman
(74) *Attorney, Agent, or Firm* — Oblon, Spivak, McClelland, Maier & Neustadt, L.L.P.

(57) ABSTRACT

The present invention relates to a fluorescent lamp including: a discharge space containing a discharge gas and being surrounded by a glass; a discharge electrode; a phosphor; and a mayenite type compound provided on at least a part of an inner surface contacting the discharge gas. According to the fluorescent lamp of the present invention, a fluorescent lamp that has good luminous efficiency of ultraviolet ray from a discharge gas, has good discharge characteristics such as discharge starting voltage and discharge sustaining voltage in a fluorescent lamp, is chemically stable, has excellent oxidation resistance, has excellent sputtering resistance, and can achieve electric power saving is provided.

20 Claims, 8 Drawing Sheets

FOREIGN PATENT DOCUMENTS

| | | |
|---|---|---|
| EP | 1876628 A1 * | 1/2008 |
| JP | 5-275065 | 10/1993 |
| JP | 8-36995 | 2/1996 |
| JP | 2001-332212 | 11/2001 |
| JP | 2007-077283 | 3/2007 |
| JP | 2008-47434 | 2/2008 |
| JP | 2009-59643 | 3/2009 |
| WO | 2006/112455 | 10/2006 |
| WO | WO 2008/023673 A1 | 2/2008 |

OTHER PUBLICATIONS

The Extended European Search Report issued Jun. 6, 2011, in Application No. / Patent No. 09754708.7-2208 / 2302662 PCT/JP2009059626.

U.S. Appl. No. 13/405,607, filed Feb. 27, 2012, Ito, et al.

* cited by examiner

FLUORESCENT LAMP

TECHNICAL FIELD

The present invention relates to a fluorescent lamp.

BACKGROUND ART

Currently, a fluorescent lamp is used in applications such as lightings, backlight of a display device and light irradiation in various manufacturing processes. Such a fluorescent lamp generally has an electron tube containing a discharge gas, and a xenon lamp, a mercury lamp, a metal halide lamp, a cold cathode fluorescent lamp, a hot cathode fluorescent lamp, a semi-hot fluorescent lamp, a flat fluorescent lamp, an external electrode rare gas fluorescent lamp, a dielectric barrier discharge excimer lamp and the like are known.

Of those fluorescent lamps, in a fluorescent lamp mainly performing arc discharge, a cathode is heated by cation impact to lead to thermionic arc discharge. However, to reduce voltage for lighting initiation and improve startability, a cathode material is required to have large secondary electron emission coefficient due to excitation of a gas for light emission such as mercury, and additionally a rare gas (mainly argon gas) sealed as a gas for starting.

A fluorescent lamp mainly performing glow discharge had the problem that cathode fall (potential difference) causing in the vicinity of a cathode is large, resulting in decrease in luminous efficiency. On the other hand, the electron tube can reduce the cathode fall by improving secondary electron emission characteristics of a cathode. For this reason, a chemically stable cathode material having large secondary electron emission coefficient and suitable for the production of an electron tube has been required.

A fluorescent lamp having xenon (Xe) gas sealed therein can improve luminous efficiency of ultraviolet ray by increasing Xe concentration, but has the problem that discharge voltage is increased. For this reason, an electrode or a dielectric material, having excellent electron emission characteristics has been required. As an electrode, Ni and Mo have conventionally been used as a material of a discharge electrode, but have had insufficient electron emission characteristics. To respond to this problem, it has been proposed to arrange cesium (Cs) which is a substance having excellent electron emission characteristics, on a surface of an electrode (see Patent Document 1). However, it has been difficult to obtain sufficient electron emission characteristics.

BACKGROUND ART

Patent Document
    Patent Document 1: JP-A 2001-332212

SUMMARY OF THE INVENTION

Problems that the Invention is to Solve

The present invention has an object to provide a fluorescent lamp that has good luminous efficiency of ultraviolet rays from a discharge gas, has good discharge characteristics such as discharge starting voltage and discharge sustaining voltage in a fluorescent lamp, is chemically stable, has excellent oxidation resistance, has excellent sputtering resistance, and can achieve electric power saving.

Means for Solving the Problems

The present invention provides a fluorescent lamp comprising: a discharge space containing a discharge gas and being surrounded by a glass; a discharge electrode; a phosphor; and a mayenite type compound provided on at least a part of an inner surface contacting the discharge gas.

Advantage of the Invention

The fluorescent lamp of the present invention has excellent electron emission characteristics of a mayenite type compound. Therefore, the fluorescent lamp has high luminous efficiency of ultraviolet rays, has high discharge efficiency, has low discharge voltage, has good discharge characteristics, is chemically stable, has excellent oxidation resistance, and has excellent sputtering resistance.

MODE FOR CARRYING OUT THE INVENTION

Figure 1:
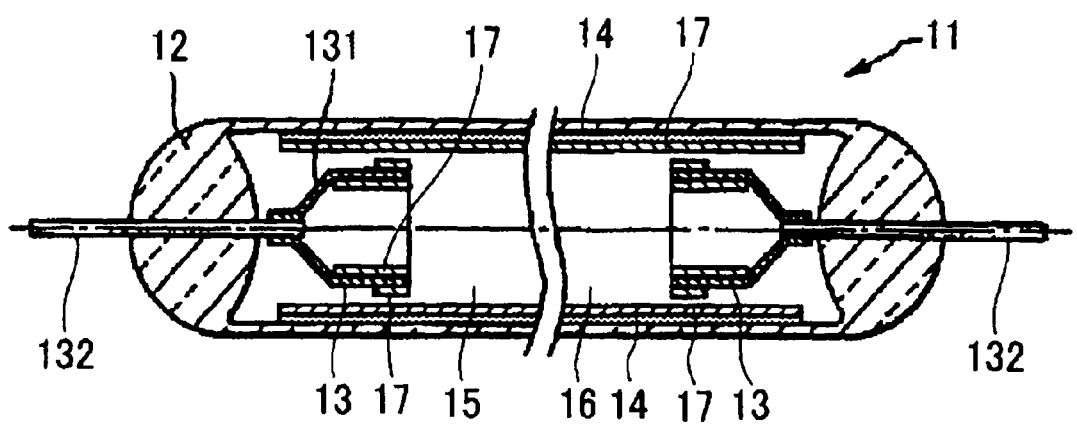
FIG. 1 is a schematically cross-sectional view of a cold cathode fluorescent tube which is one embodiment of the present invention.

The fluorescent lamp of the present invention is described below.

The fluorescent lamp of the present invention is a fluorescent lamp comprising: a discharge space containing a discharge gas and being surrounded by a glass; a discharge electrode; a phosphor; and a mayenite type compound provided on at least a part of an inner surface contacting the discharge gas.

Specifically, the fluorescent lamp of the present invention is a fluorescent lamp comprising a tubular or container-like glass having a space inside thereof, a discharge electrode, a phosphor and a mayenite type compound, in which the inner space of the glass is filled with a discharge gas, and the mayenite type compound is provided on at least a part of an inner surface contacting the discharge gas.

Form of the fluorescent lamp of the present invention and positional relationship of each constituent are not particularly limited, except for the position of the mayenite type compound, so long as electric field is generated in the inside of a tubular or container-like glass by applying voltage between discharge electrodes, positively charged atoms run into a cathode to emit secondary electrons, the secondary electrons run into a discharge gas to generate ultraviolet rays, and the ultraviolet rays are converted into visible light by a phosphor, thereby emitting light. For example, the form and the positional relationship may be the same as those of the conventional fluorescent lamps. Example of the fluorescent lamp includes a fluorescent lamp comprising a glass tube having both ends being sealed, and discharge electrodes provided on the inside or the outside of the both ends, wherein the inside of the glass tube is filled with a discharge gas, a phosphor is applied to an inner surface of the glass tube, and a mayenite type compound is provided on given sites.

The mayenite type compound has secondary electron emission characteristics of ion excitation passed through Auger process, that is, excellent characteristics in potential emission, and therefore has high secondary electron emission coefficient during low voltage discharging. In other words, because the mayenite type compound has excellent electron emission characteristics, particularly excellent secondary electron emission characteristics of ion excitation during low voltage discharging, lighting circuit can make simple and inexpensive by reducing voltage for discharge starting, and a fluorescent lamp having excellent startability can be produced.

Furthermore, the mayenite type compound shows good thermoelectron emission characteristics equivalent to those of ordinary metal electrodes even in thermoelectron emission, and therefore can be used as an electrode material of a hot cathode type electron tube.

In particular, when conductive mayenite described hereinafter is arranged as a mayenite type compound inside the discharge space, the conductive mayenite has high secondary electron emission coefficient, and therefore further has the effects that a luminous efficiency of ultraviolet rays of a discharge gas (penning mixed gas) is improved, and in addition to this, discharge voltage and cathode fall voltage are decreased. Furthermore, a fluorescent lamp saves electric power, and a circuit for discharging can be inexpensive. Work function of the conductive mayenite is nearly 2 eV, and therefore, secondary electron emission coefficient due to potential emission is large.

The discharge gas in the fluorescent lamp of the present invention is not particularly limited, and for example, the conventional discharge gases can be used. Furthermore, inert gas and the like can be used. The discharge gas preferably contains at least one rare gas selected from the group consisting of He, Ne, Ar, Kr, Xe and Rn, and may further contain mercury.

The discharge electrode in the fluorescent lamp of the present invention has a function to cause discharge in a discharge space, and contains a conductive material. When the discharge electrode is present inside the glass tube, the discharge electrode preferably has large secondary electron emission coefficient. Furthermore, the discharge electrode preferably has high durability to sputtering.

The phosphor in the fluorescent lamp of the present invention is not particularly limited, and the conventional phosphors can be used. Examples of the phosphor include rare earth phosphors and halophosphoric acid type phosphors. Specific examples of the phosphor include $Y_2O_3$:Eu, (Y,Gd)$BO_3$:Eu, $LaPO_4$:Ce,Tb, $Zn_2SiO_4$:Mn, $Y_2SiO_4$:Tb, $(Sr,Ca,Ba,Mg)_5(PO_4)_3Cl$:Eu, and $BaMgAl_{10}O_{17}$:Eu,Mn.

The fluorescent lamp of the present invention has a mayenite type compound therein. Specifically, the mayenite type compound is provided on at least a part of an inner surface contacting the discharge gas. The term "inner surface" used herein means a surface contacting the discharge gas, and specifically means a surface contacting the discharge gas, of a glass tube, and a discharge electrode, a phosphor and other materials (such as a dielectric layer), present inside the glass tube. The mayenite type compound may be present on the inner surface (for example, in a layer form), and may form such an inner surface. In other words, the mayenite type compound is contained in a glass tube, and a discharge electrode, a phosphor and a dielectric layer (such as in a particle form), present inside the glass tube, and may be exposed on the inner layer. The mayenite type compound is present on at least a part of the inner surface, and therefore contacts the discharge gas. Ions or electrons generated in the discharge gas run into the mayenite type compound, and as a result, secondary electrons are emitted from the mayenite type compound.

The mayenite type compound is described below.

The mayenite type compound in the present invention is preferably $12CaO \cdot 7Al_2O_3$ (hereinafter referred to as "C12A7") having a cage structure and a compound having a crystal structure equivalent to the C12A7 (compound of the same type).

The mayenite type compound may be a compound in which oxygen ions are included in the cage, and a part of cations or anions in a skeleton or the cage is substituted in such a range that a skeleton of C12A7 crystal lattice and a cage structure formed by the skeleton are maintained. Oxygen ions included in the cage are hereinafter referred to as "free oxygen ions" according to customary practices.

In the present invention, the mayenite type compound may be a compound that a part or the whole of free oxygen ions is substituted with electrons, or a part of electrons substituted is further substituted with anions. Furthermore, the mayenite type compound is preferably that a part or the whole of free oxygen ions is substituted with electrons, and the compound has an electron density of $1.0 \times 10^{15}$ cm$^{-3}$ or more. The mayenite type compound having such an electron density is referred to as "conductive mayenite" in the present invention.

In the present invention, the mayenite type compound may be that a part or the whole of at least one atom selected from Ca, Al and O is substituted with other atoms or atomic groups, so long as the mayenite type compound has a crystal structure of C12A7 crystal comprising Ca, Al and O (oxygen). For example, a part of Ca may be substituted with atoms such as Mg, Sr and Ba, and a part of Al may be substituted with Si, Ge, B, Ga or the like. The mayenite type compound is preferably $12CaO \cdot 7Al_2O_3$ compound, $12SrO \cdot 7Al_2O_3$ compound, mixed crystal compounds thereof, or compounds of same type of those compounds. At least a part of free oxygen may be substituted with anions of atoms having electron affinity smaller that that of the free oxygen.

Anions include halogen ions, hydrogen anions, oxygen ions and hydroxide ions.

Specific examples of the mayenite compound include the following compounds (1) to (4), but the mayenite type compound is not limited to those compounds.

(1) Calcium magnesium aluminate $(Ca_{1-y}Mg_y)_{12}Al_{14}O_{33}$ and calcium strontium aluminate $Ca_{12-z}Sr_zAl_{14}O_{33}$ which are mixed crystals in which a part of Ca of the skeleton of the C12A7 compound is substituted with magnesium or strontium. In the chemical formulae, y and z are preferably 0.1 or less.

(2) $Ca_{12}Al_{10}Si_4O_{35}$ which is a silicon-substitution type mayenite.

(3) $Ca_{12}Al_{14}O_{32}:2OH^-$ or $Ca_{12}Al_{14}O_{32}:2F^-$ in which free oxygen ions in a cage are substituted with anions such as $H_2^-$, $H^{2-}$, $O^-$, $O_2^-$, $OH^-$, $F^-$, $Cl^-$, $Br^-$, $S^{2-}$ or $Au^-$. Those mayenite type compounds have high heat resistance, and are therefore suitable for the production of a fluorescent lamp requiring sealing or the like at a temperature exceeding 400° C.

(4) Wadalite $Ca_{12}Al_{10}Si_4O_{32}:6Cl^-$ in which cations and anions are substituted.

Electron density of the conductive mayenite is preferably $1.0 \times 10^{15}$ cm$^{-3}$ or more, more preferably $1.0 \times 10^{19}$ cm$^{-3}$ or more, and further preferably $1.0 \times 10^{21}$ cm$^{-3}$ or more. The reason for this is that secondary electron emission performance is further increased, luminous efficiency of ultraviolet rays is further improved and discharge voltage is further decreased. Where the electron density is too high, production of the conductive mayenite becomes complicated. Therefore, the electron density is preferably $7.0 \times 10^{21}$ cm$^{-3}$ or less, more preferably $4.6 \times 10^{21}$ cm$^{-3}$ or less, and further preferably $2.3 \times 10^{21}$ cm$^{-3}$ or less.

The electron density of the conductive mayenite means a measurement value of spin density measured using an electron spin resonance apparatus. However, in the case where the measurement value of the spin density exceeds $10^{19}$ cm$^{-3}$, electron density of the conductive mayenite can quantitatively be determined by measuring intensity of light absorption due to electrons in a cage of a conductive mayenite using a spectrophotometer, obtaining absorption coefficient at 2.8 eV, and then utilizing that the absorption coefficient is in proportion to electron density. In the case where the conductive mayenite is powder and it is difficult to measure transmission spectrum by a photometer, light diffusion spectrum is measured using an integrating sphere, and electron density of the conductive mayenite can quantitatively be determined from a value obtained by Kubelka-Munch method.

Portion having the mayenite type compound in the fluorescent lamp of the present invention, for example, a portion containing the mayenite type compound in a dielectric layer and a discharge electrode, and the mayenite type compound itself, have secondary electron emission coefficient γ of preferably 0.05 or more, more preferably 0.1 or more, and further preferably 0.2 or more. When many secondary electrons are present, ionization of discharge gas molecule or atom becomes easy in a discharge gas, and as a result, charge starting voltage is decreased, and cathode fall voltage is decreased. For example, when the discharge gas contains Xe, Xe atoms ionize by secondary electrons at lower applied voltage, and discharge plasma is generated. As a result, ultraviolet rays are emitted from Xe, thereby improving efficiency of ultraviolet emission. As a result, a fluorescent lamp having good discharge characteristics such that efficiency of a fluorescent lamp is high can be obtained.

The secondary electron emission coefficient γ can be adjusted by adjusting electron density of the conductive mayenite. For example, if the electron density is $1.0 \times 10^{19}$ cm$^{-3}$, the secondary electron emission coefficient γ of Xe ion can be 0.15 when energy of an ion is 600 eV. Furthermore, for example, when the electron density is $1.0 \times 10^{21}$ cm$^{-3}$, the secondary electron emission coefficient γ can be 0.18.

The mayenite type compound can be produced, for example, as follows.

First, calcium carbonate and aluminum oxide are mixed such that molar ratios in terms of oxides of CaO and $Al_2O_3$ are about 12:7 (for example, from 11.8:7.2 to 12.2:6.8), and the resulting mixture is held at a temperature of from about 1,200 to 1,350° C. for about 6 hours under ordinary pressures in air to conduct a solid phase reaction, and then cooled to room temperature. Thus, a mayenite type compound can be produced.

Furthermore, the conductive mayenite can be produced by further conducting the following treatment.

A sintered compact of the mayenite type compound obtained above is pulverized using a tungsten carbide-made planetary mill, followed by pressure molding to obtain pellets, and the pellets are again heated to from 1,200 to 1,350° C. to obtain a sintered compact. The sintered compact thus obtained is placed in a container with a lid together with a powdery or broken piece-like reducing agent of carbon, metallic titanium, metallic calcium, metallic aluminum or the like, the resulting mixture is held at from 600 to 1,415° C. in a state that the inside of the container is maintained under low oxygen partial pressure, and then cooled. Thus, conductive mayenite particles can be obtained. When the temperature is 1,415° C. or lower, the mayenite type compound is difficult to melt, and can be treated by an inexpensive apparatus, which is preferred. When the temperature is 600° C. or higher, a rate of a reaction of drawing free oxygen ions from a cage of the mayenite type compound is relatively fast, and the conductive mayenite is relatively fast obtained, which is preferred. Even when the sintered compact is placed in a container with a lid, comprising a reducing agent such as carbon, metallic titanium, metallic calcium or metallic aluminum (for example, a carbon-made container with a lid) and treated, the conductive mayenite can similarly be obtained. Electron density of the conductive mayenite obtained can be adjusted by adjusting oxygen particle pressure in the container.

Preferred embodiment of the fluorescent lamp of the present invention is described by referring to the drawings.

Cold Cathode Fluorescent Tube (CCFL)

FIG. 1 is a schematically cross-sectional view showing a cold cathode fluorescent tube which is one embodiment of the fluorescent lamp of the present invention. The embodiment shown in FIG. 1 is hereinafter referred to as "Embodiment 1".

A cold cathode fluorescent tube 11 shown in FIG. 1 is constituted such that discharge electrodes 13 are sealed to both ends of a tubular glass tube 12, and a discharge gas 16 which is a rare gas containing mercury is sealed in a discharge space 15 in the glass tube 12, and a phosphor 14 is applied to an inner surface of the glass tube 12. The discharge electrode 13 comprises a cup 131 and a lead wire 132, and the cup 131 has a cylindrical shape, and the end thereof has a conical shape. The cup is electrically connected to the lead wire 132 at the end thereof by welding or the like. The lead wire 132 is projected from the inside of the glass tube 12 to the outside thereof as shown in FIG. 1.

A layered mayenite type compound 17 is arranged on the inner surface contacting the discharge gas 16, specifically a surface of the phosphor 14 and a surface of the cup 131.

The cold cathode fluorescent tube which is one embodiment of the fluorescent lamp of the present invention may differ from Embodiment 1 shown in FIG. 1. For example, the mayenite type compound may be present only on a part of the portion shown in FIG. 1. For example, the mayenite type compound may not be present on the surface of the phosphor 14, and may be present only on an inner wall of the cup 131. The cup 131 may be that the end thereof has a semi-spherical shape, and further has a cylindrical shape, a rod shape, a line shape, a coil shape and a hollow shape. The mayenite type compound 17 may be arranged on portions (the glass tube 12 and the lead wire 132) other than the phosphor 14 and the cup 131 so long as the portions are an inner surface contacting the discharge gas 16. The mayenite type compound 17 preferably is contained in the cup 131 and the lead wire 132, and is a part of a material constituting those. In other words, the fluorescent lamp is preferred that the phosphor is arranged on at least a part of the inner surface contacting a discharge gas, a pair of the discharge electrodes is oppositely arranged in the discharge space, and the discharge electrode contains the mayenite type compound. The mayenite type compound 17 may be contained in the phosphor 14 and the glass tube 12, and may be a part of a material constituting those.

Size of the cold cathode fluorescent tube is not particularly limited. For example, the outer diameter thereof is from about 2.0 to 5.0 mm, and the overall length thereof in an axis direction is from about 300 to 2,000 mm.

It is preferred that the discharge electrode 13 has the cup 131 which is a hollow metal-made cylinder, and the cup 131 is covered with the mayenite type compound 17. When the discharge electrode 13 has a cylindrical shape, holding area of the mayenite type compound 17 can be increased. It is further preferred that only the inner wall of the cup 131 is covered with the mayenite type compound 17. The reason for this is that discharge mainly occurs inside the cup 131 in the hollow cup 131. When only the inside of the cylindrical cup 131 is covered with the mayenite type compound, the discharge gas 16 and the glass tube 12 is prevented from contamination in the case that sputtering is generated when discharging.

The discharge electrode (in the case of Embodiment 1, the cup 131 and the lead wire 132) may be a metal containing the mayenite type compound prepared by sintering, and may be the mayenite type compound in a bulk form. This structure forms a discharge electrode having excellent sputtering resistance. To obtain sufficient discharge efficiency in this structure, the mayenite type compound preferably has conductivity of $10^{-3}$ S/cm or more. The mayenite type compound is a ceramic material, and therefore has excellent sealing characteristics with a glass, and this makes it possible to prepare such a structure.

A production method of the cold cathode fluorescent tube is not particularly limited. For example, the mayenite type compound is attached to at least a part of the inside contacting a discharge gas using a method of mixing a powdery mayenite type compound with a solvent or the like by a wet process ordinary used, and applying the resulting mixture to the desired portions using spray coating or dip coating, or using a physical vapor deposition method such as vacuum vapor deposition, electron beam vapor deposition, sputtering or flame spraying. Specifically, a slurry comprising, for example, a phosphor, a solvent and a binder is prepared, the slurry is applied to an inner wall of a glass tube by dip coating or the like, and heat treatment for holding at 200 to 800° C. for 20 to 30 minutes to remove the binder, thereby arranging the phosphor on the inner wall of the glass tube. In the case that the mayenite type compound is contained in the phosphor, a mayenite type compound powder is mixed with the slurry.

To obtain a powdery mayenite type compound, for example, the mayenite type compound is pulverized by mechanically adding compressing, shear and friction force to the material using a metal-made or ceramic-made hammer, roller or ball. In this case, when a planetary mill using tungsten carbide balls is used, foreign matters do not incorporate into coarse particles of the mayenite type compound, and coarse particle having a particle diameter of 50 μm can be obtained. The mayenite type compound thus obtained can be pulverized to finer particles having an average particle diameter of 20 μm or less using ball mill or jet mill. Those particles having an average particle diameter of 20 μm or less can be mixed with an organic solvent or a vehicle to prepare a slurry or a paste. However, when the mayenite type compound roughly pulverized to particles of 50 μm or less is mixed with an organic solvent, followed by beads pulverization, a dispersion of the mayenite type compound powder having smaller particle size of 5 μm or less in terms of a circle dispersed therein can be prepared. The beads pulverization can use, for example, zirconium oxide beads. The solvent used in the pulverization is a hydroxyl group-containing compound having 1 or 2 carbon atoms. For example, when alcohols or ethers are used, the mayenite type compound reacts with those and may decompose. For this reason, the alcohol type or ether type solvents are preferably solvents having 3 or more carbon atoms. When those solvents are used, pulverization is easily conducted. Therefore, those solvents are used alone or as mixtures thereof.

When the powdery mayenite type compound is applied to the desired portions of the cold cathode fluorescent tube using a method such as the above-described wet process or physical vapor deposition, a chemical vapor deposition method such as CVD, or a sol gel method, and the cold cathode fluorescent tube is held at 500 to 1,415° C. in an atmosphere of low oxygen partial pressure, adhesion of the powdery mayenite type compound becomes good, which is preferred. Furthermore, when the heat treatment is conducted, the mayenite type compound becomes conductive, thereby developing high electron emission characteristics, which is preferred.

In the heat treatment, the oxygen partial pressure is preferably lower than $P_{O2}$ shown by the following formula (a). In the formula (a), T is a temperature of an atmosphere gas, and unit of the oxygen partial pressure ($P_{O2}$) is Pa.

$$P_{O2}=10^5 \times \exp[\{-7.9 \times 10^4/(T+273)\}+14.4] \tag{a}$$

When the same treatment is conducted using a raw material mixed powder, a calcined powder, a glass powder or an amorphous material powder, each having a composition equivalent to that of the mayenite type powder, that is, a powdery mayenite type compound precursor, in place of the powdery mayenite type compound, the mayenite type compound can be obtained in the course of the heat treatment, and production steps can be reduced, which is preferred. In this case, the temperature holding the cold cathode fluorescent tube in an atmosphere of low oxygen partial pressure is from 500 to 1,415° C. as same above. The temperature is preferably from 800 to 1,415° C., and more preferably from 950 to 1,300° C.

As the raw material mixed powder used, compounds of simple elements constituting C12A7 compound, such as calcium carbonate and aluminum oxide may be used by mixing those in given compositional ratio. Calcium aluminate compound having a ratio between Ca and Al of, for example, 3:1 or 1:1 may be used. Furthermore, two kinds or more of calcium aluminate compounds having Ca/Al ratio of 1 may be used.

The discharge electrode is prepared as follows. Lead wire is attached to a cup formed in a cylindrical shape using a metal member such as nickel, molybdenum or tungsten, by a method such as laser welding or resistance heating, a slurry containing the mayenite type compound is applied to the cup by dip coating, spray coating or the like, and the cup is held at from 80 to 500° C. When the atmosphere in this case is an inert gas or vacuum, characteristics of the mayenite type compound can be prevented from deterioration. However, the cup can be held in air.

When the discharge electrode is a porous body, adhesion of the mayenite type compound is increased, and durability is improved, which is preferred.

The thus-obtained discharge electrode having the thus-obtained mayenite type compound arranged thereon is inserted in a glass tube, and is sealed thereto. Hg getter comprising Ti—Hg alloy or the like is inserted in the glass tube, the inside of the glass tube is evacuated, and a rage gas such as Ar or Ne is sealed therein. Getter activation by a heat treatment is conducted to release Hg gas.

Thus, the cold cathode fluorescent tube can be obtained.

When the discharge electrode having the mayenite type compound arranged thereon is exposed to plasma, the mayenite type compound is converted to conductive mayenite, and electron emission characteristics are improved, which is preferred. When plasma contacts the surface of a crystalline body of the mayenite type compound (that is, by plasma treatment), mainly a surface portion of the crystalline body of the mayenite type compound changes into conductive mayenite. Depth of the portion changing into conductive mayenite, from the surface varies depending on the conditions of plasma treatment. Only the surface portion can be used as a crystalline body of the mayenite type compound having changed into conductive mayenite.

Discharge plasma generated in a rare gas can be used as the plasma. This is simple and is therefore preferred. The rare gas can use at least one rare gas selected from argon, xenon, helium, neon and krypton. Argon, xenon and a mixed gas thereof are more preferred, and argon is further preferred. The rare gas can be used together with other inert gases.

The plasma treatment is preferably a treatment using plasma generated by glow discharge.

Atmosphere pressure in this case is preferably pressure at which ordinary glow discharge plasma is generated, that is, pressure of from about 0.1 to 1,000 Pa. Flow rate of a gas introduced into the atmosphere is preferably adjusted so as to achieve the pressure.

The plasma treatment using glow discharge includes plasma treatment using a sputtering system. When sputtering treatment is conducted using a crystalline body of a mayenite type compound as a target of the sputtering system, the plasma generated contacts the crystalline body of the mayenite type compound as the target, and the surface of the crystalline body changes into conductive mayenite. In the plasma treatment method, free oxygen ions in the mayenite type compound are effectively substituted with electrons by selective sputtering.

External Electrode Fluorescent Lamp (EEFL)

The external electrode fluorescent lamp is described below by referring to FIG. 2A and FIG. 2B.

Figure 2A:
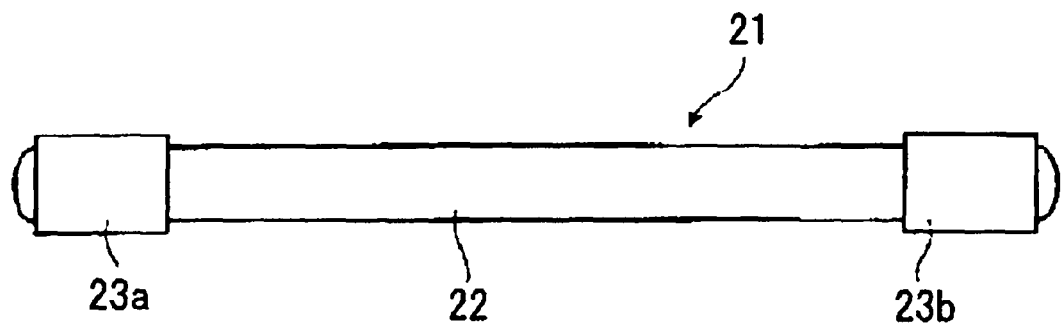
FIG. 2A is a schematically external view of an external electrode type fluorescent lamp for backlight for liquid crystal, which is other embodiment of the present invention.
Figure 2B:
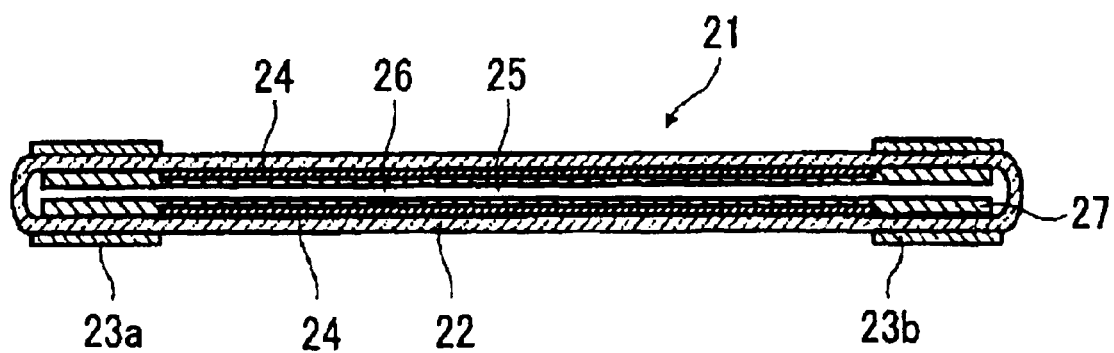
FIG. 2B is a schematically cross-sectional view in its axis direction.

FIG. 2A and FIG. 2B are schematic views showing an external electrode fluorescent lamp which is one embodiment of the fluorescent lamp of the present invention. FIG. 2A is a schematically external view, and FIG. 2B is a schematically cross-sectional view in an axis direction. The embodiment shown in FIG. 2A and FIG. 2B is hereinafter referred to as "Embodiment 2".

External electrode fluorescent lamp 21 shown in FIG. 2A and FIG. 2B is a fluorescent lamp comprises a glass tube 22, a discharge space 25 containing a discharge gas 26, surrounded by the glass tube 22, a discharge electrode 23, a phosphor 24, and a layered mayenite type compound 27 provided on an inner surface contacting the discharge gas 26 of the glass tube 22. A pair of the discharge electrodes 23 (23a and 23b) is arranged at both ends of an outer surface of the glass tube 22 surrounding the discharge space 25, and the phosphor 24 and the mayenite type compound 27 are arranged on at least a part of the inner surface contacting the discharge gas 26.

The discharge electrode 23 is a layered external electrode having conductivity provided on outer surface of both ends of the glass tube 22. In Embodiment 2, the external electrode is formed over the entire outer circumferential surface of the ends of the glass tube 22, as shown in FIG. 2A and FIG. 2B. The external electrode is connected to an external power source for generating discharge in an inner space of the glass tube 22 through, for example, a lead wire and a clip terminal. When high frequency voltage is applied to the external electrode, the external electrode fluorescent lamp 21 emits light.

The mayenite type compound 27 is preferably arranged on an inner wall portion of the glass tube 22 of a portion on which one discharge electrode (discharge electrode 23a) covers the glass tube 22, and a region of 30 mm in a direction of other discharge electrode (discharge electrode 23b) from the inner wall portion, in the inner wall of the glass tube 22. The preferred arrangement of the discharge electrode 23b and the mayenite type compound 27 is the same as in the discharge electrode 23a.

When the mayenite type compound 27 is arranged as above, a region having large flux of ions is covered with the mayenite type compound having excellent sputtering resistance. As a result, life of a lamp is prolonged, good secondary electron emission effect is obtained, luminous efficiency is improved, and discharge starting voltage is decreased.

The external electrode fluorescent lamp which is one embodiment of the fluorescent lamp of the present invention may differ from Embodiment 2 shown in FIG. 2A and FIG. 2B.

For example, the electrode is not a cylindrical discharge electrode (external electrode) having open both ends as shown in FIG. 2A and FIG. 2B, but the electrode may be formed over the sealing portion of the glass tube 22. Furthermore, the glass tube is not the straight tube type glass tube 22 as shown in FIG. 2A and FIG. 2B, but can have various shapes. For example, the glass tube may be L-shaped and U-shaped glass tubes. Overall length, outer diameter and inner diameter of the glass tube 22 are not particularly limited, and the glass tube having, for example, an outer diameter of 4 mm and an inner diameter of 3 mm can be used. Glass material constituting the glass tube 22 is not particularly limited.

A production method of the external electrode fluorescent lamp is not particularly limited. The external electrode fluorescent lamp can be produced by, for example, the conventional methods. For example, a paste containing a phosphor and a mayenite type compound is applied to an inner surface of a glass tube, dried and fired. The glass tube is sealed with the ordinary method. An organic metal paste or the like is applied to an outer surface of ends of the glass tube having mercury precipitated inside and fired to form a discharge electrode (external electrode). Mercury precipitated in the discharge space inside the glass tube is diffused by the ordinary method.

Furthermore, for example, a slurry comprising a phosphor, a solvent and a binder is prepared, the slurry is applied to an inner wall of a glass tube by dip coating or the like, dried, and fired to remove the binder. Thus, the phosphor is arranged on the inner wall of the glass tube. One end of the glass tube is sealed, and mercury releasing metal is inserted in other end side, followed by evacuation. A rare gas is then introduced into the glass tube, followed by sealing. Mercury is released by heating the mercury releasing alloy with high frequency, and the glass tube is then sealed at a position inside than the insertion portion of the mercury releasing alloy. A pair of discharge electrodes is formed on an outer surface of the glass tube. Thus, an external electrode fluorescent lamp is completed. The discharge electrode is formed by covering the outer surface of the glass tube with a conductive tape or applying a metal paste to the outer surface by screen printing or transfer printing, followed by firing.

The mayenite type compound can be arranged on the phosphor by applying a slurry containing the mayenite type compound to an inner surface of the phosphor. Furthermore, when a slurry containing the mayenite type compound is applied to the glass tube, and a slurry comprising a phosphor, a solvent and a binder is then applied thereto, the mayenite type compound is arranged on an inner surface of the glass tube. Thus, a structure that the phosphor covers the mayenite type compound can be formed. In the case of allowing the phosphor to contain the mayenite type compound, a mayenite type compound powder is mixed with the slurry.

Figure 3:
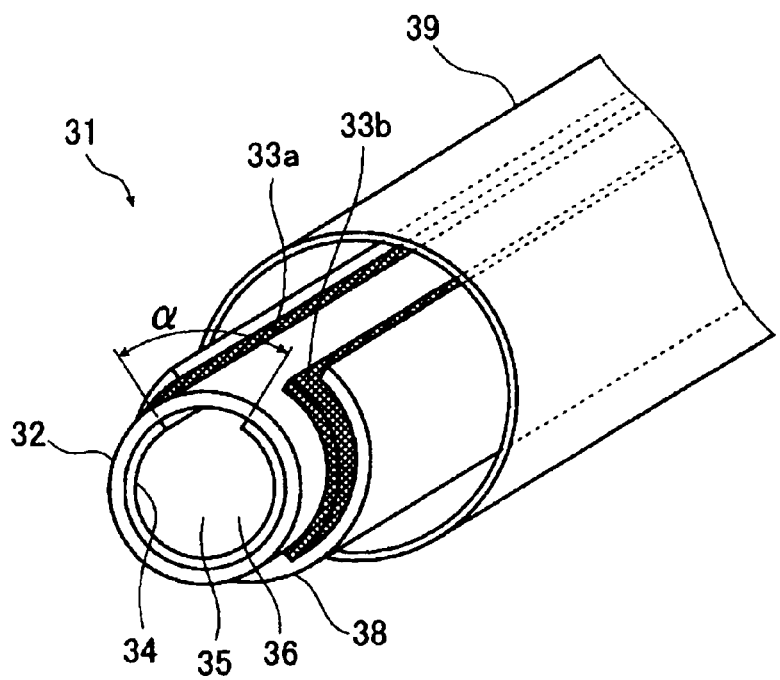
FIG. 3 is a schematically cross-sectional view (perspective view) of an external electrode type fluorescent lamp for a copying machine, which is other embodiment of the present invention.

FIG. 3 is a schematic view showing other embodiment of the external electrode fluorescent lamp described above.

The external electrode fluorescent lamp of the embodiment shown in FIG. 3 has an opening (aperture: α) and is mainly used in a copying machine and the like.

The embodiment shown in FIG. 3 is hereinafter referred to as "Embodiment 3".

An external electrode fluorescent lamp 31 shown in FIG. 3 is a fluorescent lamp comprising a discharge space 35 containing a discharge gas 36 and being surrounded by a glass 32, a discharge electrode 33, and a phosphor 34, the entire fluorescent lamp being surrounded by a tube 39. A pair of discharge electrodes 33 (33a and 33b) is arranged on an outer surface of the tubular glass 32 surrounding the discharge space 35, and the phosphor 34 containing a particulate mayenite type compound is arranged on at least a part of an inner surface contacting the discharge gas 36.

In the external electrode fluorescent lamp of the present invention, the embodiment that a projected area of the mayenite type compound when the mayenite type compound is arranged is 30% or less of an area of an inner wall of the glass tube is preferred for the reason that light extraction efficiency is improved. The projected area is more preferably 20% or less, and further preferably 10% or less.

When the mayenite type compound is provided on such a region, discharge starting voltage of the external electrode fluorescent lamp is decreased by electron emission effect from the mayenite type compound, and luminous efficiency is increased. In one of the particularly preferred embodiment, the discharge gas is a mixed gas containing Xe. In this case, concentration of the Xe is preferably more than 20%. The mayenite type compound has excellent secondary electron emission characteristics of Xe excitation. Therefore, the effect of decreasing discharge starting voltage becomes remarkable as Xe concentration in the discharge gas is increased.

Flat Fluorescent Lamp (FFL)

Figure 4:
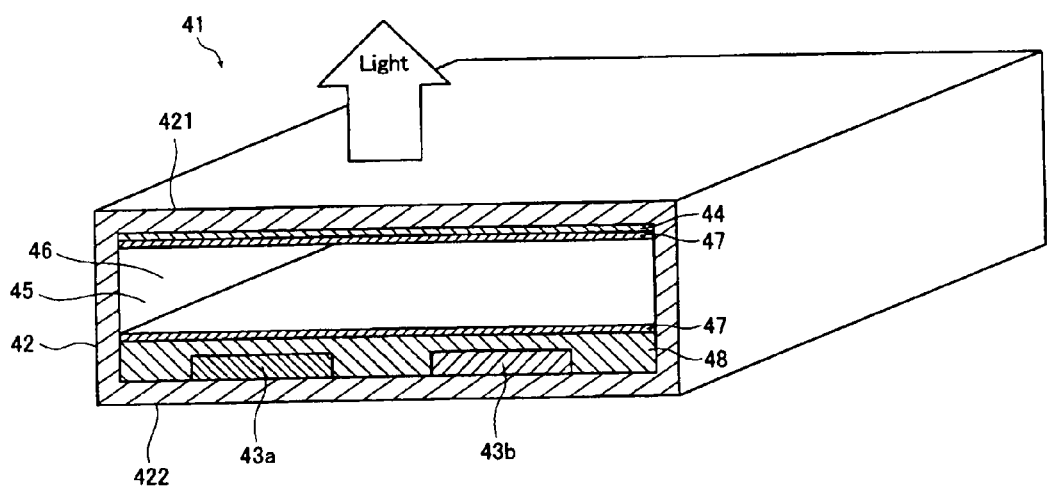
FIG. 4 is a schematically cross-sectional view of a flat fluorescent lamp which is other embodiment of the present invention.

FIG. 4 is a schematically cross-sectional view showing a flat lamp which is one embodiment of the fluorescent lamp of the present invention. The embodiment shown in FIG. 4 is hereinafter referred to as "Embodiment 4".

A flat fluorescent lamp 41 shown in FIG. 4 is a fluorescent lamp comprising a discharge space 45 containing a discharge gas 46 and being surrounded by a glass container 42, a discharge electrode 43, a layered phosphor 44, and a layered mayenite type compound 47 provided on an inner surface contacting the discharge gas 46. A front glass substrate 421 and a back glass substrate 422, that are two main surfaces of the glass container 42 face to each other through the discharge space 45, a discharge electrode 43a and a discharge electrode 43b are formed on a surface of the back glass substrate 422, the discharge electrode 43 is covered with a dielectric layer 48, and the layered mayenite type compound 47 is attached to the dielectric layer 48.

The flat fluorescent lamp which is one embodiment of the fluorescent lamp of the present invention may differ from Embodiment 4 shown in FIG. 4.

For example, the discharge electrode 43 may be formed on at least one surface of the front glass substrate 421 and the back glass substrate 422. In other words, the discharge electrode 43 may be formed on at least a part of the surface of the front glass substrate 421 and/or the back glass substrate 422. The mayenite type compound 47 may be contained in the phosphor 44 arranged on an inner surface of the front glass substrate 421 of the discharge space 45 surrounded by the glass container 42. Furthermore, the mayenite type compound 47 may be contained in the dielectric layer 48, and may be arranged on a surface of the dielectric layer 48.

A production method of the flat fluorescent lamp is not particularly limited, and the flat fluorescent lamp can be produced by, for example, the conventional methods. For example, a pair of the discharge electrodes 43 comprising a conductive material is formed on a surface of the back glass substrate 422, and the dielectric layer 48 is then formed using glass frit or the like. Furthermore, a slurry comprising the mayenite type compound 47, the phosphor 44, a solvent and a binder is prepared, the slurry is applied to an inner wall of the front glass substrate 421 by a method such as spray coating or screen printing, followed by drying and firing, thereby removing the binder, and the phosphor 44 containing the mayenite type compound 47 is formed on an inner surface of a glass container. After sealing the front glass substrate 421 and the back glass substrate 422, a rare gas such as a mixed gas of Ne and Xe is sealed in the glass container. Thus, a flat fluorescent lamp can be obtained.

The flat fluorescent lamp 41 having the mayenite type compound 47 arranged on the dielectric layer 48 is prepared as follows. A pair of the discharge electrodes 43 comprising a conductive material is formed on the back glass substrate 422, the dielectric layer 48 is then formed thereon using glass frit or the like, and a paste or a slurry, containing the mayenite type compound 47 is applied thereto using screen printing, spin coating, spray coating or the like, followed by holding at from 80 to 500° C. In this case, when the atmosphere is an inert gas or vacuum, the characteristics of the mayenite type compound 47 can be prevented from deterioration. However, holding in air is possible. Thereafter, a slurry comprising a phosphor, a solvent and a binder is prepared, the slurry is applied to an inner wall of the front glass substrate 421 by a method such as spray coating or screen printing, followed by drying and firing, thereby removing the binder, and the phosphor 44 containing the mayenite type compound 47 is formed on an inner surface of the glass container 42. After sealing the front glass substrate 421 and the back glass substrate 422, a rare gas such as a mixed gas of Ne and Xe is sealed as the discharge gas 46 into the glass container. Thus, the flat fluorescent lamp 41 can be obtained.

To form a layered mayenite type compound on a surface of the dielectric layer, a powder of the mayenite type compound is mixed a solvent to prepare a slurry or a paste, and the slurry or the paste is applied to the dielectric layer, followed by firing. Thus, the layered mayenite type compound can be obtained. The application method includes spray coating, die coating, roll coating, dip coating, curtain coating, spin coating and gravure coating. Spin coating and spray coating are particularly preferred in that powder density can simply and accurately be controlled. Preferred firing conditions of the coating film are that the temperature is preferably from 100 to 800° C. at which an organic material as a component of a slurry is decomposed and the mayenite type compound is sufficiently fixed to a thin film layer.

When conductive mayenite is used as the mayenite type compound, temperature which does not accelerate oxidation action of conductive mayenite is preferred. In such a case, the temperature is preferably a range of from 100 to 600° C. The firing time is preferably about 10 minutes.

The present invention can measure discharge starting voltage, cathode fall voltage and secondary electron emission coefficient γ by conducting open cell discharge measurement.

Figure 6:
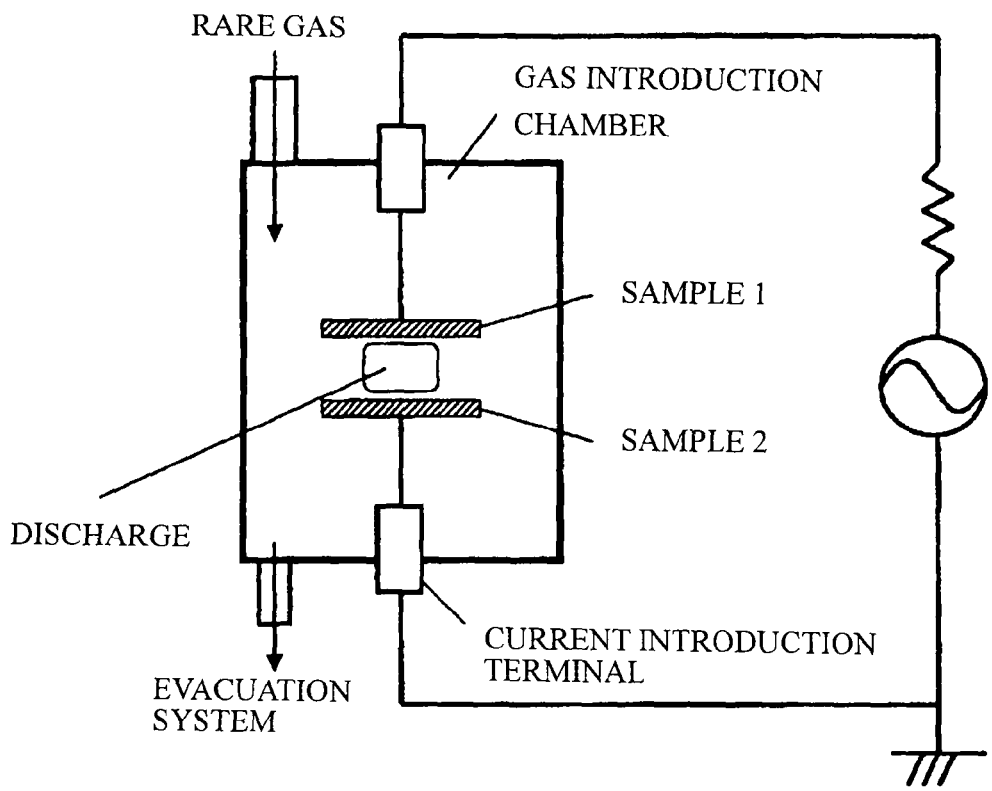
FIG. 6 is a view for explaining an open cell discharge measurement apparatus.

The open cell discharge measurement system is, for example, the embodiment shown in FIG. 6. In the open cell discharge measurement system, two samples (sample 1 and sample 2) are placed to face to each other, a rare gas such as Ar or Xe is introduced, and alternating current or direct current voltage is applied between those samples. Discharge is generated between the samples, and discharge starting voltage, cathode fall voltage and secondary electron emission coefficient γ can be measured.

EXAMPLES

The present invention is described below by reference to the examples.

γ of Al Reduction Bulk Electron Density $10^{21}$ cm$^{-3}$

Calcium carbonate and aluminum oxide were mixed in a molar ratio of 12:7, and the resulting mixture was held at 1,300° C. for 6 hours in the atmosphere to prepare $12CaO.7Al_2O_3$. This powder was shaped into a molding using a uniaxial pressing machine. The molding was held at 1,350° C. for 3 hours in air to prepare a sintered compact. The sintered compact was white. As a result of measurement of conductivity using a current/voltage meter, the molding was an insulating material which does not show conductivity. The sintered compact was placed in an alumina container with a lid together with metallic aluminum. The container was heated to 1,300° C. in a vacuum furnace, and held for 10 hours therein. The container was gradually cooled to room temperature. The heat-treated product obtained showed blackish brown, and was confirmed to be a mayenite type compound by X-ray diffraction measurement. It was seen that electron density is $1.4 \times 10^{21}$ cm$^{-3}$ from light absorption spectrum measured using U3500 manufactured by Hitachi, Limited. It was seen that the product has electric conductivity of 120 S/cm by van der Pauw method. As a result of measurement of electron spin resonance (hereinafter referred to as "ESR") signal of the heat-treated product obtained with JES-TE300 manufactured by JEOL, it was seen that the heat-treated product has an asymmetric form having g value of 1.994 which is characteristic in a conductive mayenite type compound having high electron density exceeding $10^{21}$ cm$^3$. The product obtained is conductive mayenite, and is hereinafter referred to as "Sample A".

Figure 5:
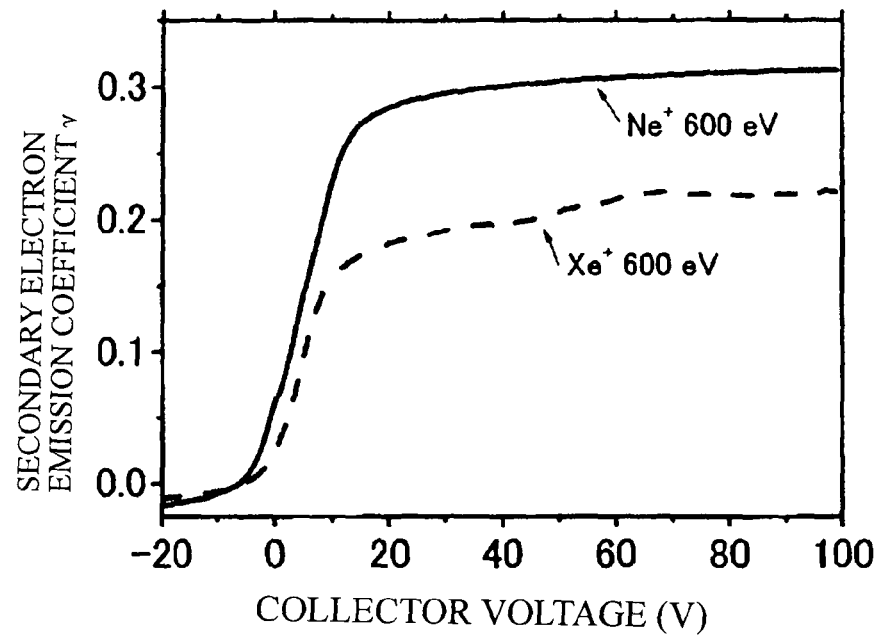
FIG. 5 is a relationship view between collector voltage of conductive mayenite and a secondary electron emission coefficient ($\gamma$), measured in the examples.

Sample A was placed as a target in a secondary electron emission characteristic measurement apparatus. The degree of vacuum in the apparatus was set to about $10^{-5}$ Pa, and Sample A was irradiated with Ne$^+$ or Xe$^+$ at accelerating voltage of 600 eV. As a result, secondary electron emission characteristics as shown in FIG. 5 were obtained. The fact that γ value is saturated when collector voltage is nearly 70V or higher indicates that all of secondary electrons emitted were captured. As shown in FIG. 5, the value of secondary electron emission coefficient γ in this case was 0.31 in the case by Ne$^+$ excitation and 0.22 in the case by Xe$^+$ excitation, when collector voltage is 70V.

Discharge starting voltage, secondary electron emission coefficient and cathode fall voltage of Sample A were measured using the open cell discharge measurement system shown in FIG. 6.

Discharge Starting Voltage Measurement Test (1)

Sample A as a cathode and metallic Mo as an anode were placed in a vacuum chamber in a state of facing to each other with a distance of about 0.4 mm. A silica glass-made jig for sample was used to place the cathode and the anode. The vacuum chamber was evacuated to about $10^{-4}$ Pa, and xenon gas was then introduced therein. Alternating current voltage of 1 kHz was applied and discharge starting voltage was measured. As a result, the discharge starting voltage was 308V when the product of P×d is about 1.05 torr·cm, wherein P is gas pressure in the vacuum chamber and d is a distance between the cathode and the anode.

The cathode and the anode were exchanged (that is, metallic Mo was used as the cathode, and Sample A was used as the anode), and the same measurement was conducted. As a result, the discharge starting voltage at the same product of P×d was 334V. It was seen from this result that voltage reduction effect of 26V is obtained by using Sample A as a cathode.

Secondary Electron Emission Coefficient Measurement Test (1)

Figure 7:
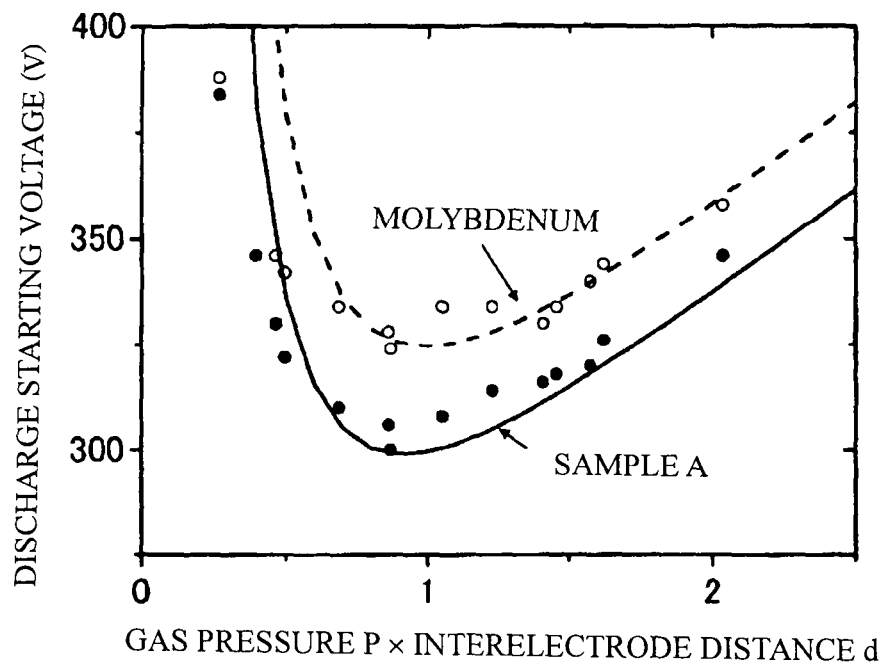
FIG. 7 is a view showing measurement results of a discharge starting voltage and a secondary electron emission coefficient in the examples.

In each case that Sample A or metallic Mo was used as a cathode as above, pressure was variously changed, and Paschen curve as shown in FIG. 7 was obtained. Ratio (γA(Xe)/γMo(Xe)) between a secondary electron emission coefficient (γMo(Xe)) of Sample A and a secondary electron emission coefficient (γA(Xe)) of metallic Mo was obtained from the Paschen's low. As a result, the ratio was 2.0.

Cathode Fall Voltage (1)

Figure 8:
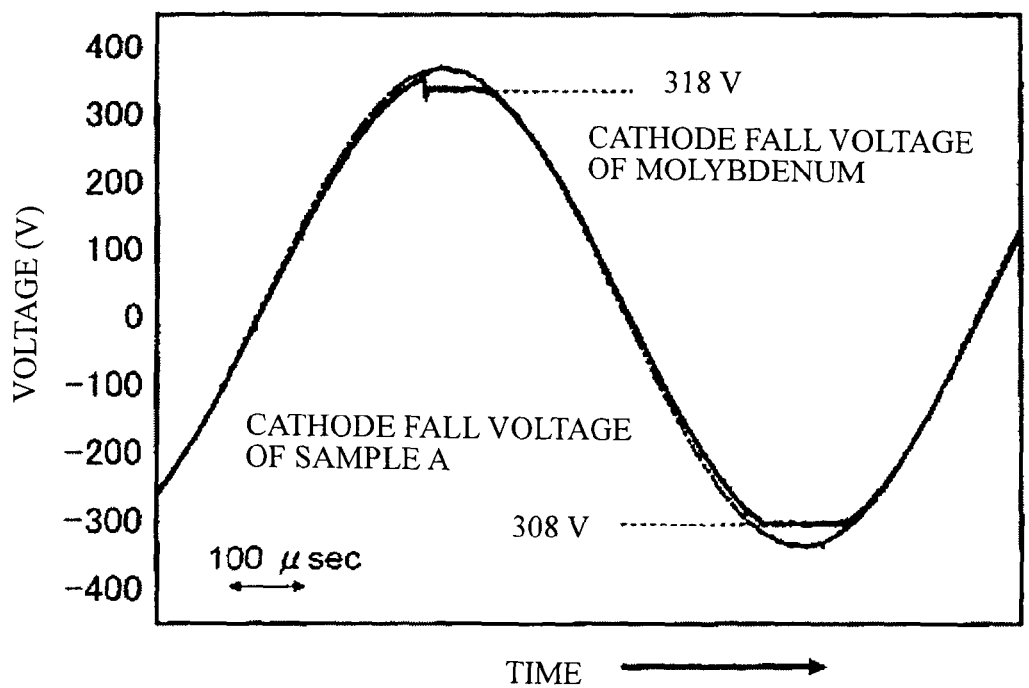
FIG. 8 is a view showing measurement results of cathode fall voltage of Sample A in the examples.

In each case that Sample A or metallic Mo was used as a cathode as above, change in time of voltage between a cathode and an anode was measured. As a result, the cathode fall voltage in the case of using Sample A as a cathode was about 308V (see FIG. 8). Furthermore, in the case that gas pressure and a cathode-anode distance are the same and metallic Mo is used as a cathode, the cathode fall voltage was about 318V. It was seen from those results that cathode fall voltage is reduced when Sample A is used as a cathode.

Discharge Starting Voltage Measurement Test (2)

Argon gas was introduced in place of xenon gas, and the discharge starting voltage was measured in the same manner as in the above Discharge Starting Voltage Measurement Test (1). As a result, when the product of P·d is about 0.89 torr·cm, the discharge starting voltage in the case of using Sample A as a cathode was 238V, and the discharge starting voltage in the case of using metallic Mo as a cathode was 256V. Thus, it was seen from those results that the voltage reduction effect of 18V is obtained.

Secondary Electron Emission Coefficient Measurement Test (2)

Similarly, argon gas was introduced in place of xenon gas, and the same operation as in the above Secondary Electron Emission Coefficient Measurement Test (1). Paschen cures regarding Sample A and metallic Mo were obtained. As a result, the γA(Ar)/γMo(Ar) value was 1.8.

Cathode Fall Voltage (2)

Similarly, argon gas was introduced in place of xenon gas, and the same operation as in the above Cathode Fall Voltage (1) was conducted. As a result, the cathode fall voltage in the case of using Sample A as a cathode was about 216V, and the cathode fall voltage in the case of using metallic Mo as a cathode was about 224V.

It was seen from those results that cathode fall voltage is reduced when Sample A is used as a cathode.

Fluorescent lamps according to Embodiments 1 to 4 described using FIGS. 1 to 4 are produced using Sample A (conductive mayenite). The fluorescent lamps according to those embodiments of the present invention have excellent electron emission characteristics of the mayenite type compound. Therefore, those fluorescent lamps have high efficiency of ultraviolet luminescence, have high discharge efficiency, have low discharge voltage, resulting in good discharge characteristics, are chemically stable, have excellent oxidation resistance, and have excellent sputtering resistance.

Sample which is a powdery mayenite type compound was prepared and the same test as above was conducted.

Calcium carbonate and aluminum oxide were mixed in a molar ratio of 12:7, and the resulting mixture was held at 1,300° C. for 6 hours in the atmosphere to prepare C12A7 compound. This powder was shaped into a molding using a uniaxial pressing machine. The molding was held at 1,350° C. for 3 hours in air to prepare a sintered compact having a sintered density exceeding 99%. The sintered compact was white, and was an insulating material which does not show conductivity. The sintered compact was held in a carbon crucible with a lid. The crucible was placed in a tubular furnace through which nitrogen passes, and then held at 1,300° C. for 3 hours, followed by cooling to room temperature. The compound obtained showed green. The compound was subjected to measurements of X-ray diffraction, light diffusion reflective spectrum and ESR. As a result, it was confirmed that the compound is conductive mayenite having electron concentration of about $10^{20}$ cm$^{-3}$ (the compound is hereinafter referred to as "Sample B").

The conductive mayenite compound was placed in a crushing container together with 2-propanol and zirconia beads having a diameter of 0.1 mm. Mass ratio of those materials was Sample B:2-propanol:zirconia oxide beads=1:9:75. The crushing container was held at a rate of revolution of 600 revolutions/hour for 24 hours. The contents were filtered to prepare a slurry containing Sample B. Concentration of Sample B in the slurry was adjusted using a centrifugal sedimentator to obtain Slurry A. Average particle diameter of the conductive mayenite (Sample B) in Slurry A was measured using a particle size distribution measuring instrument (UPA150, manufactured by Microtrac). As a result, the average particle diameter was 800 nm.

Slurry A is applied to a metallic molybdenum plate by a spin coating method to obtain the metallic molybdenum plate having particles of Sample B adhered to the surface thereof (hereinafter referred to as "Sample C"). The surface of Sample C was observed using an optical microscope, and the number of particles per unit area (number density) was measured. As a result, the number density of the particles was about 0.06 particle/μm$^2$.

Sample C was subjected to the same charge starting voltage measurement test and cathode fall voltage measurement test as above.

Discharge Starting Voltage Measurement Test (3)

Sample C as a cathode and metallic Mo as an anode were placed in a vacuum chamber in a state of facing to each other with a distance of about 0.7 mm. The vacuum chamber was evacuated to about $10^{-4}$ Pa, and argon gas was then introduced therein. Alternating current voltage of 1 kHz was applied and discharge starting voltage was measured. As a result, the discharge starting voltage was 200V when the product of P×d is about 1.79 torr·cm.

The cathode and the anode were exchanged, and the same measurement was conducted. As a result, the discharge starting voltage at the same product of P×d was 214V. It was seen from this result that voltage reduction effect of 14V is obtained by using Sample C as a cathode.

Cathode Fall Voltage (3)

The same operation as in the above Cathode Fall Voltage (1) was conducted. As a result, the cathode fall voltage in the case of using Sample C as a cathode was about 192V, and the cathode fall voltage in the case of using metallic Mo as a cathode was about 200V.

It was seen from those results that cathode fall voltage is reduced when Sample C is used as a cathode.

Sample of the mayenite type compound of other embodiment was prepared, and the same test as above was conducted.

Calcium carbonate and aluminum oxide were prepared in molar ratio of 12:7 in terms of oxides of CaO and Al$_2$O$_3$, and mixed. The mixture obtained was held at 1,300° C. for 6 hours in air to perform a solid phase reaction, followed by cooling to room temperature. The sintered compact obtained was pulverized using ball mill, the resulting powder was pressure-molded to form pellets, and the pellets were again heated to 1,350° C. Thus, a sintered compact was obtained. The sintered compact obtained was placed in a carbon container with a lid, and held at from 1,200 to 1,300° C. for 2 hours therein in a state that the inside of the container is maintained at low oxygen partial pressure, followed by cooling. Thus, a conductive mayenite type compound (hereinafter referred to as "Sample D") was prepared. Sample D was pulverized using ball mill to prepare a powder, and the powder was mixed with nitrocellulose and terpineol to prepare a paste. The paste was applied to a surface of a metallic tungsten substrate using a screen printing machine, followed by firing at 500° C. for 30 minutes in air. The substrate was held at from 1,200 to 1,300° C. for 30 minutes in a carbon container in vacuum. As a result, a tungsten substrate having a conductive mayenite type compound in a film shape adhered to the surface thereof (hereinafter referred to as "Sample E") was obtained.

Discharge Starting Voltage Measurement Test (4)

Sample E as a cathode and metallic Mo as an anode were placed in a vacuum chamber in a state of facing to each other with a distance of about 1.3 mm in the same method as Discharge Starting Voltage Measurement Test (1). The vacuum chamber was evacuated to about $10^{-4}$ Pa, and argon gas was then introduced therein. Alternating current voltage of 1 kHz was applied and discharge starting voltage was measured. As a result, the discharge starting voltage was 242V when the product of P×d is about 1.66 torr·cm.

The cathode and the anode were exchanged, and the same measurement was conducted. As a result, the discharge starting voltage at the same product of P×d was 272V. It was seen from this result that voltage reduction effect of 30V is obtained by using Sample E as a cathode.

Cathode Fall Voltage (4)

Figure 9:
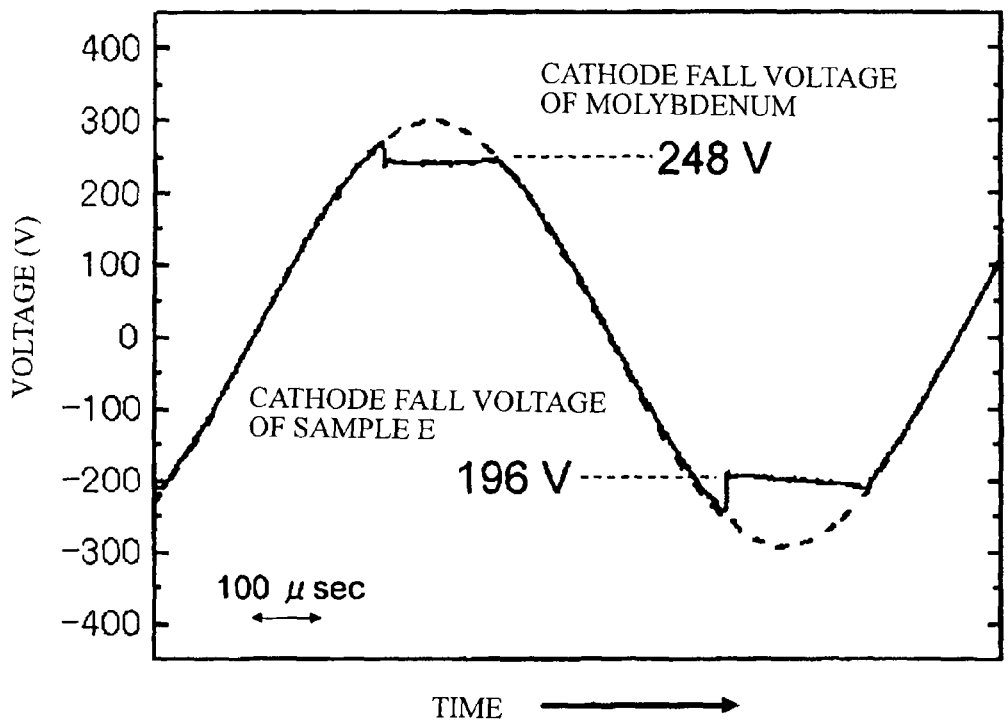
FIG. 9 is a view showing measurement results of cathode fall voltage of Sample E in the examples.

The same operation as in the above Cathode Fall Voltage (1) was conducted. As a result, the cathode fall voltage in the case of using Sample E as a cathode was about 196V, and the cathode fall voltage in the case of using metallic Mo as a cathode was about 248V. It was seen from those results that cathode fall voltage is reduced when Sample E is used as a cathode (FIG. 9).

Metallic tungsten substrate before applying the conductive mayenite type compound thereto was used as a cathode in place of Sample E, and the same measurements as in the above Discharge Starting Voltage Measurement (4) and Cathode Fall Voltage (4) were conducted. As a result, the discharge starting voltage was 260V, and the cathode fall voltage was 230V.

Discharge Starting Voltage Measurement Test (5)

Sample F was obtained in the same method as in the case of obtaining Sample E, except for using a metallic molybdenum substrate in place of the metallic tungsten substrate.

Sample F as a cathode and metallic Mo as an anode were placed in a vacuum chamber in a state of facing to each other with a distance of about 0.39 mm in the same method as Discharge Starting Voltage Measurement Test (1). The vacuum chamber was evacuated to about $10^{-4}$ Pa, and argon gas was then introduced therein. Alternating current voltage of 1 kHz was applied and discharge starting voltage was measured. As a result, the discharge starting voltage was 228V when the product of P×d is about 1.48 torr·cm.

The cathode and the anode were exchanged, and the same measurement was conducted. As a result, the discharge starting voltage at the same product of P×d was 278V. It was seen from this result that voltage reduction effect of 50V is obtained by using Sample F as a cathode.

Cathode Fall Voltage (5)

Figure 10:
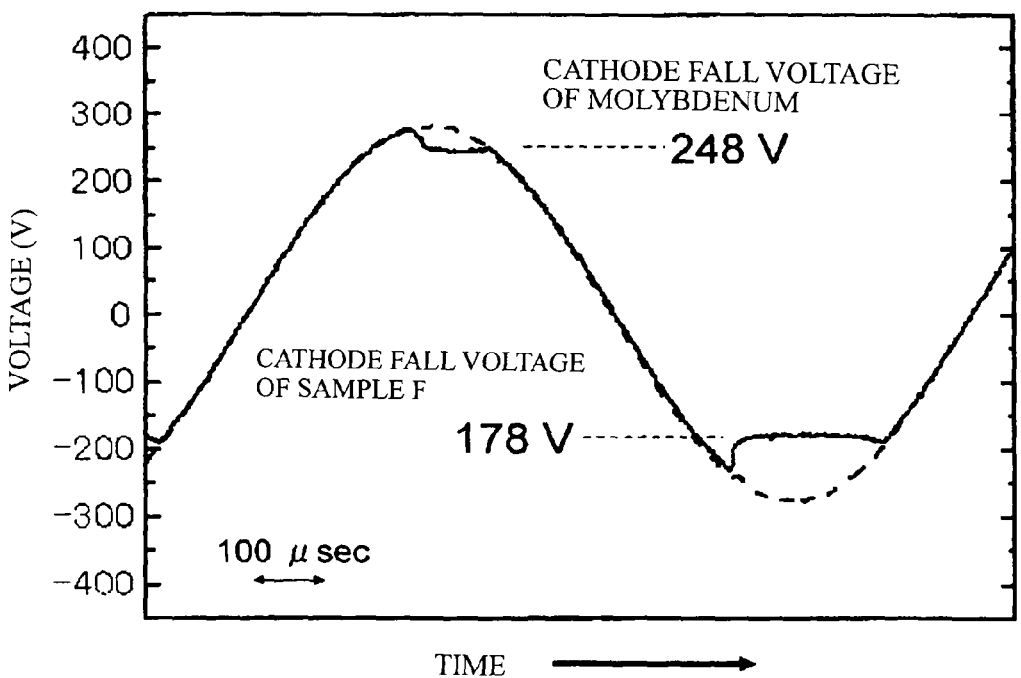
FIG. 10 is a view showing measurement results of cathode fall voltage of Sample F in the examples.

The same operation as in the above Cathode Fall Voltage (1) was conducted. As a result, the cathode fall voltage in the case of using Sample F as a cathode was about 178V, and the cathode fall voltage in the case of using metallic Mo as a cathode was about 248V. It was seen from those results that cathode fall voltage is reduced when Sample F is used as a cathode (FIG. 10).

Discharge Starting Voltage Measurement Test (6)

Sample G was obtained in the same method as in the case of obtaining Sample E, except for using a metallic nickel substrate in place of the metallic tungsten substrate.

Sample G as a cathode and metallic Mo as an anode were placed in a vacuum chamber in a state of facing to each other with a distance of about 0.16 mm in the same method as Discharge Starting Voltage Measurement Test (1). The vacuum chamber was evacuated to about $10^{-4}$ Pa, and argon gas was then introduced therein. Alternating current voltage of 10 Hz was applied and discharge starting voltage was measured. As a result, the discharge starting voltage was 212V when the product of P×d is about 3.45 torr·cm.

The cathode and the anode were exchanged, and the same measurement was conducted. As a result, the discharge starting voltage at the same product of P×d was 248V. It was seen from this result that voltage reduction effect of 36V is obtained by using Sample G as a cathode.

Cathode Fall Voltage (6)

Figure 11:
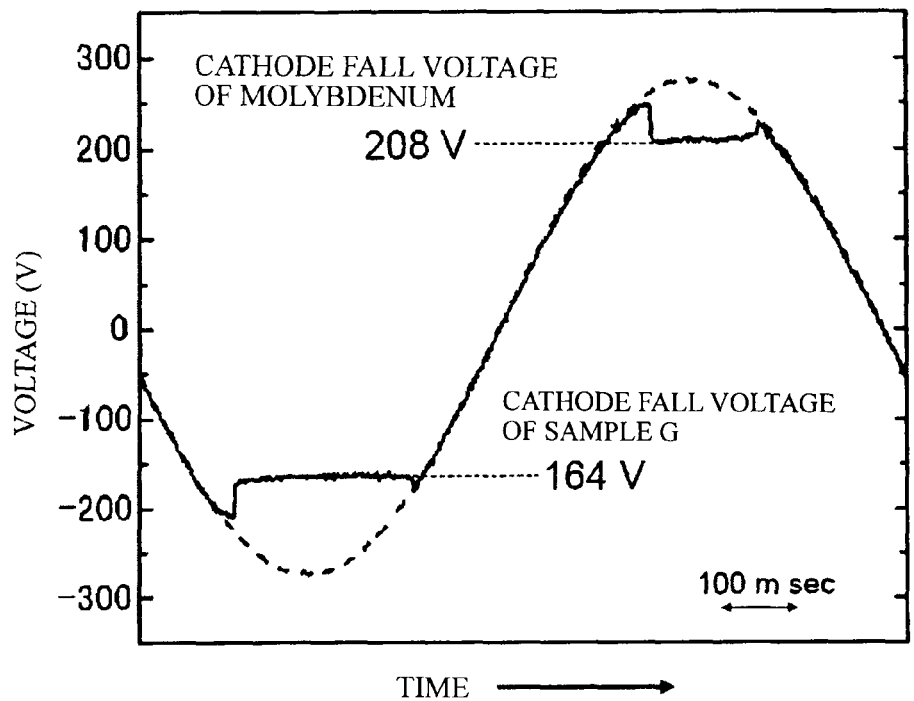
FIG. 11 is a view showing measurement results of cathode fall voltage of Sample G in the examples.

The same operation as in the above Cathode Fall Voltage (1) was conducted. As a result, the cathode fall voltage in the case of using Sample G as a cathode was about 164V, and the cathode fall voltage in the case of using metallic Mo as a cathode was about 208V. It was seen from those results that cathode fall voltage is reduced when Sample G is used as a cathode (FIG. 11).

Discharge Starting Voltage Measurement Test (7)

Sample H was obtained in the same method as in the case of obtaining Sample E, except for using a metallic kovar substrate in place of the metallic tungsten substrate.

Sample H as a cathode and metallic Mo as an anode were placed in a vacuum chamber in a state of facing to each other with a distance of about 1.3 mm in the same method as Discharge Starting Voltage Measurement Test (1). The vacuum chamber was evacuated to about $10^{-4}$ Pa, and argon gas was then introduced therein. Alternating current voltage of 10 Hz was applied and discharge starting voltage was measured. As a result, the discharge staring voltage was 248V when the product of P×d is about 2.22 torr·cm.

The cathode and the anode were exchanged, and the same measurement was conducted. As a result, the discharge starting voltage at the same product of P×d was 268V. It was seen from this result that voltage reduction effect of 20V is obtained by using Sample H as a cathode.

Cathode Fall Voltage (7)

Figure 12:
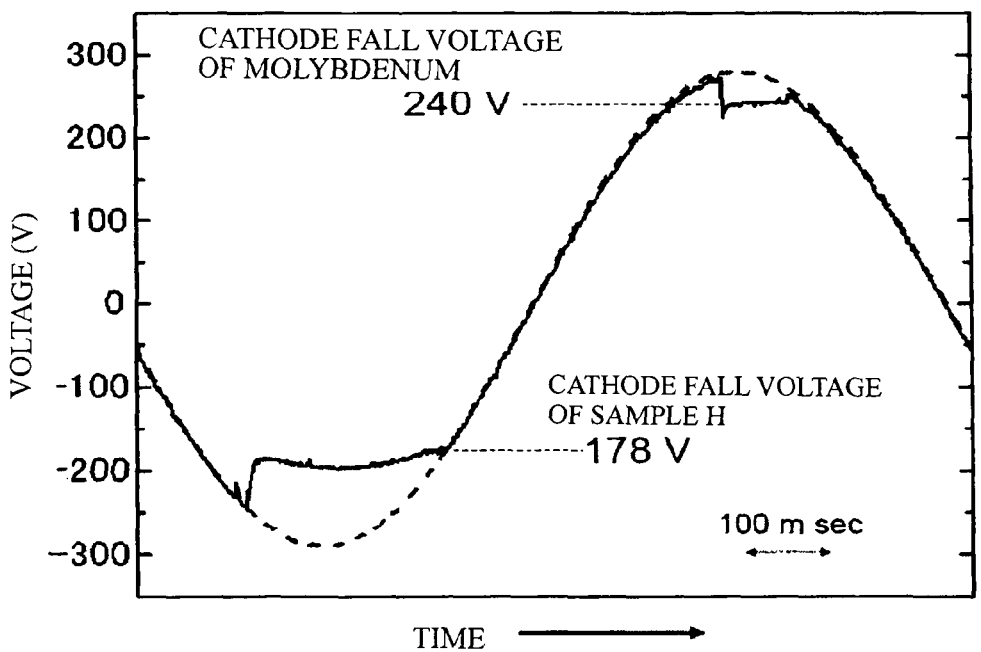
FIG. 12 is a view showing measurement results of cathode fall voltage of Sample H in the examples.

The same operation as in the above Cathode Fall Voltage (1) was conducted. As a result, the cathode fall voltage in the case of using Sample H as a cathode was about 178V, and the cathode fall voltage in the case of using metallic Mo as a cathode was about 240V. It was seen from those results that cathode fall voltage is reduced when Sample H is used as a cathode (FIG. 12).

Discharge lamps that are the same type of the discharge lamp shown in FIG. 1, in which a discharge electrode comprising a conductive mayenite type compound is used and a discharge electrode comprising metallic molybdenum is used, were prepared, respectively. Cathode fall voltages and discharge starting voltages of the respective discharge lamps were measured and compared.

Discharge Lamp Preparation (1)

Discharge lamp of the same type of FIG. 1 was prepared using a conductive mayenite type compound as a discharge electrode. This discharge lamp is constituted that discharge electrodes are sealed to both ends of a glass tube and Ar gas as a discharge gas is sealed in a discharge space of a glass tube. The phosphor 14 is not applied to an inner surface of the glass tube. The discharge electrode of one end comprises a cup comprising a conductive mayenite type compound, a nickel-made pin with a screw, fixed to the cup, and a kovar-made lead wire welded to the pin. The cup has a cylindrical shape, has an outer diameter of 8 mm, an inner diameter of 5 mm, a length of 16 mm and a depth of 5 mm, and has a hollow portion which is a cylindrical depression. The lead wire extends to the outside of the tube from the inside thereof. The discharge electrode of other end is the same as the discharge electrode of one end, except that a cup comprising metallic nickel is used. Those two cups are placed such that the hollow portions thereof face to each other with a distance of 1 cm. The discharge lamp is that the mayenite type compound is provided on its inner surface contacting a discharge gas.

The discharge lamp as above was prepared by the following procedures.

Calcium carbonate and aluminum oxide were prepared in molar ratio of 12:7 in terms of oxides of CaO and $Al_2O_3$, and mixed. The mixture obtained was held at 1,300° C. for 6 hours in air to perform a solid phase reaction, followed by cooling to room temperature. The sintered compact obtained was pulverized using ball mill, the resulting powder was pressure-molded to form pellets, and the pellets were again heated to 1,350° C. Thus, a sintered compact was obtained. The sintered compact obtained was subjected to cutting processing to shape into a cup shape, placed in a carbon container with a lid, and held therein at from 1,200 to 1,300° C. for 6 hours in vacuum.

The cup obtained comprising a conductive mayenite type compound was connected to a lead wire portion sealed to a disk-like glass (hereinafter referred to as a "stem"). The stem is bonded to the end of a glass tube using a fire lathe to form an integrated glass tube. Discharge electrode having a cup comprising nickel, a lead wire and the stem were bonded to other end of the glass tube in the same operation. The glass tube is placed on an exhaust table, and evacuated to $10^{-6}$ Torr by an oil diffusion pump using an exhaust pipe provided in the stem portion, and held at 500° C. for 3 hours, followed by vacuum heating evacuation. Ar gas was introduced into the glass tube under a pressure of 5 Torr, and the exhaust pipe was sealed. Thus, a discharge lamp was prepared (hereinafter referred to as "Discharge Lamp A").

Direct current voltage was applied to Discharge Lamp A to discharge the Discharge Lamp A. Discharge electrode comprising a conductive mayenite type compound was used as a cathode. The applied voltage was changed, and the minimum discharge sustaining voltage was measured. As a result, the voltage was 110V. The discharge lamp is that interelectrode distance is 1 cm and positive column is not substantially generated. Therefore, the cathode fall voltage in this case is 110V. Furthermore, the applied voltage was changed to 10 Hz pulse shape, and the discharge starting voltage was measured. As a result, the voltage was 310V.

Discharge Lamp Preparation (2)

Discharge lamp was prepared by conducting the same operation as in the above Discharge Lamp Preparation (1), except that metallic molybdenum processed into the same shape is used as a discharge electrode in place of the mayenite type compound, and metallic molybdenum has previously been subjected to a vacuum heat treatment at 1,000° C. (the discharge lamp obtained is hereinafter referred to as "Discharge Lamp B"). The cathode fall voltage of the discharge lamp was 170V. The discharge starting voltage was 336V.

It was seen from the comparison in the cathode fall voltages and the discharge starting voltages, of the above Discharge Lamp A and Discharge Lamp B that the cathode fall voltage and the discharge starting voltage are decreased when the mayenite type compound is used in a discharge lamp.

Discharge Lamp Preparation (3)

Discharge lamp was prepared by conducting the same operation as in the above Discharge Lamp Preparation (1), except that Xe is used as a discharge gas in place of Ar (the discharge lamp obtained is hereinafter referred to as "Discharge Lamp C").

Similar to Discharge Lamp Preparation (1), a discharge electrode comprising a conductive mayenite type compound was used as a cathode, direct current voltage was applied, and Discharge Lamp C was discharged. The applied voltage was changed, and the minimum discharge sustaining voltage was measured. As a result, the voltage was 150V. The discharge lamp is that interelectrode distance is 1 cm and positive column is not substantially generated. Therefore, the cathode fall voltage is 150V.

The applied voltage was changed to 10 Hz pulse shape, and the discharge starting voltage was measured. As a result, the voltage was 342V.

Discharge Lamp Preparation (4)

Discharge lamp was prepared by conducting the same operation as in the above Discharge Lamp Preparation (3), except that metallic molybdenum processed into the same shape is used as a discharge electrode in place of the mayenite type compound, and metallic molybdenum has previously been subjected to a vacuum heat treatment at 1,000° C. (the discharge lamp obtained is hereinafter referred to as "Discharge Lamp D"). The cathode fall voltage of the discharge lamp was 198V. The discharge starting voltage was 440V.

It was seen from the comparison in the cathode fall voltages and the discharge starting voltages, of the above Discharge Lamp C and Discharge Lamp D that the cathode fall voltage and the discharge starting voltage are decreased when the mayenite type compound is used in a discharge lamp.

Discharge lamps that are cold cathode fluorescent lamps which are one embodiment of the same type of the discharge lamp shown in FIG. 1, in which a discharge electrode comprising a conductive mayenite type compound is used and a discharge electrode comprising metallic molybdenum is used, were prepared, respectively. Minimum discharge sustaining voltage, tube current, emission brightness and luminous efficiency of the respective discharge lamps were measured and compared.

Cold Cathode Fluorescent Lamp Preparation (1)

Cold cathode fluorescent lamp which is the same type of the discharge lamp shown in FIG. 1 was prepared using a conductive mayenite type compound as a discharge cathode. This cold cathode fluorescent lamp is constituted such that discharge electrodes are sealed to both ends of a glass tube, and Ar gas as a discharge gas is sealed in a discharge space of the glass tube. The glass tube had an outer diameter of 3 mm and an inner diameter of 2 mm. A phosphor was applied to an inner surface of the glass tube, and a length of region having the phosphor applied thereto was 15 cm. The discharge electrode comprises a cylindrical conductive mayenite type compound having a diameter of 0.8 mm and a length of 6 mm, a nickel-made sleeve having an outer diameter of 1 mm and an inner diameter of 0.8 mm, for fixing the mayenite type compound, and a kovar-made lead wire welded to the sleeve. The lead wire extends to the outside of the tube from the inside thereof. Those two discharge electrodes are placed such that the conductive mayenite type compounds face to each other with a distance of about 16 cm. The discharge lamp is that the mayenite type compound is provided on its inner surface contacting a discharge gas.

The cold discharge lamp was prepared by the following procedures.

Calcium carbonate and aluminum oxide were prepared in molar ratio 12:7 in terms of oxides of CaO and $Al_2O_3$, and mixed. The mixture obtained was held at 1,300° C. for 6 hours in air to perform a solid phase reaction, followed by cooling to room temperature. The sintered compact obtained was pulverized using ball mill, the resulting powder was pressure-molded to form pellets, and the pellets were again heated to 1,350° C. Thus, a sintered compact was obtained. The sintered compact obtained was subjected to cutting processing to shape into a cup shape, placed in a carbon container with a lid, and held therein at from 1,200 to 1,300° C. for 6 hours in vacuum.

The discharge electrode obtained comprising the conductive mayenite type compound was sealed to one end of a glass tube. The glass tube is placed on an exhaust table, and evacuated to $10^{-6}$ Torr by an oil diffusion pump using other end of the glass tube, to which a discharge electrode is not sealed, and held at 500° C. for 3 hours, followed by vacuum heating evacuation. Mercury and Ar gas were introduced into the glass tube under a pressure of 30 Torr, and a discharge electrode comprising a conductive mayenite type compound previously provided on the end of the glass tube was sealed. Thus, a cold cathode fluorescent lamp was prepared (the lamp obtained is hereinafter referred to as "Cold Cathode Fluorescent Lamp A").

Figure 13:
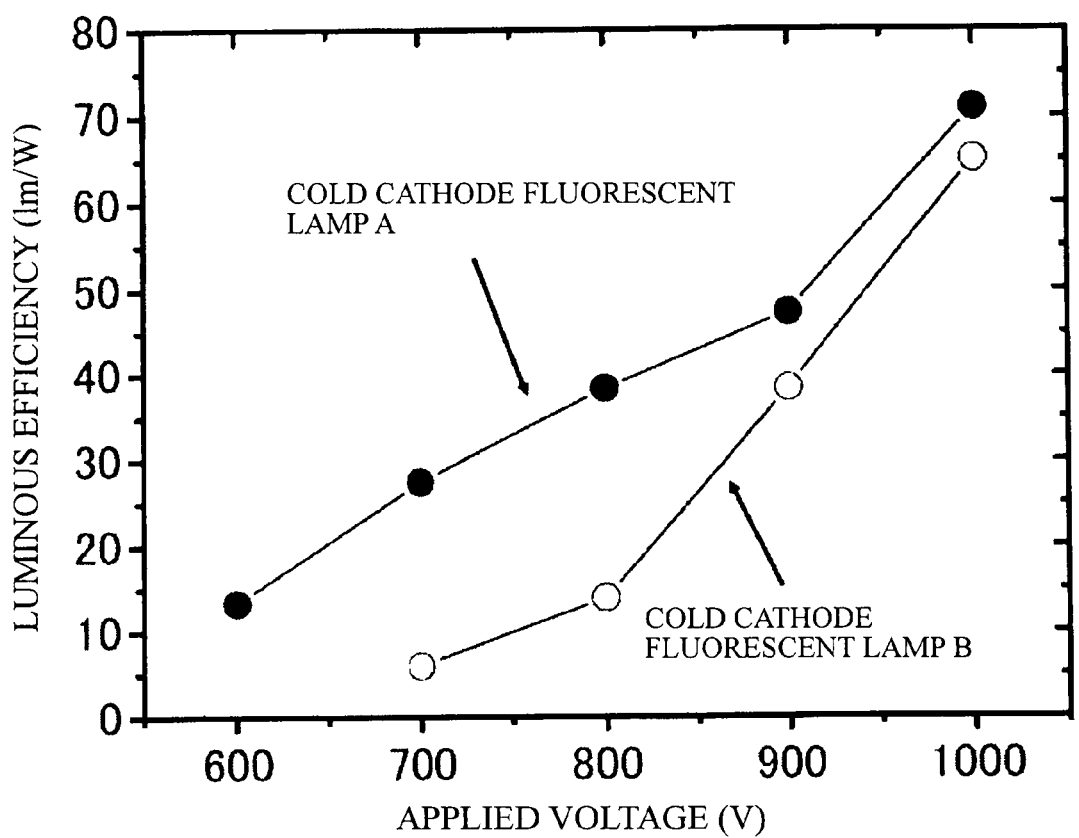
FIG. 13 is a view showing luminous efficiency of a cold cathode fluorescent lamp in the examples.

Cold Cathode Fluorescent Lamp A and resistance of 108 kΩ were connected in series, rectangular-wave pulse voltage (period: 50 μsecond, duty ratio: 0.4) was applied such that each discharge electrode alternately becomes a cathode, and Cold Cathode Fluorescent Lamp A was discharged. The applied voltage was changed and the minimum discharge sustaining voltage was measured. As a result, the voltage was 540V. Tube current and brightness were measured, and luminous efficiency was obtained (FIG. 13). As a result, it was seen that the luminous efficiency of Cold Cathode Fluorescent Lamp A when the applied voltage 1 kV is 71 lm/W.

Cold Cathode Fluorescent Lamp Preparation (2)

Cold cathode lamp was prepared by conducting the same operation as in the above Cold Cathode Fluorescent Lamp Preparation (1), except that metallic molybdenum processed into the same shape is used as a discharge electrode in place of the mayenite type compound and the metallic molybdenum has previously been subjected to a vacuum heat treatment at 1,000° C. (the lamp obtained is hereinafter referred to as "Cold Cathode Fluorescent Lamp B"). Minimum discharge sustaining voltage of this cold cathode fluorescent lamp was 580V. Tube current and brightness were measured, and luminous efficiency was obtained (FIG. 13). As a result, the luminous efficiency of Cold Cathode Fluorescent Lamp B when applied voltage is 1 kV was 65 lm/W.

It was seen from the comparison of the minimum discharge sustaining voltage and the luminous efficiency, of the above Cold Cathode Fluorescent Lamps A and B that the minimum discharge sustaining voltage is decreased and the luminous efficiency is increased, when the mayenite type compound is used in a discharge lamp.

Although the present invention has been described in detail and by reference to the specific embodiments, it is apparent to one skilled in the art that various modifications or changes can be made without departing the spirit and scope of the present invention.

This application is based on Japanese Patent Application No. 2008-142911 filed May 30, 2008, Japanese Patent Application No. 2008-300978 filed Nov. 26, 2008 and Japanese Patent Application No. 2009-092082 filed Apr. 6, 2009, the disclosures of which are incorporated herein by reference in their entities.

INDUSTRIAL APPLICABILITY

By the present invention, preparation of a fluorescent lamp comprising a discharge space containing a discharge gas and being surrounded by a glass, a discharge electrode, a phosphor, a mayenite type compound provided on at least a part of the inside of the discharge space is simplified, a fluorescent lamp having good discharge characteristics due to high secondary electron emission coefficient is obtained, and as a result, electric power saving of a fluorescent lamp is achieved.

DESCRIPTION OF REFERENCE NUMERALS AND SIGNS 11, 21, 31, 41: Cold cathode fluorescent tube
12, 22, 32, 42: Glass tube
421: Front glass substrate
422: Back glass substrate
13, 23 (a, b), 33 (a, b), 43 (a, b): Discharge electrode
131: Cup
132: Lead wire
14, 24, 34, 44: Phosphor
15, 25, 35, 45: Discharge space
16, 26, 36, 46: Discharge gas
17, 27, 37: Mayenite type compound
38: Reflective film
39: Tube
48: Dielectric layer

The invention claimed is:

1. A fluorescent lamp comprising: a discharge space containing a discharge gas and being surrounded by a glass; a discharge electrode; a phosphor; and a mayenite type compound provided on at least a part of an inner surface contacting the discharge gas, wherein the discharge electrode is a metal containing the mayenite type compound, wherein the mayenite type compound is prepared by sintering.

2. The fluorescent lamp according to claim 1, wherein the phosphor is arranged on at least a part of an inner surface contacting the discharge gas, a pair of the discharge electrodes is oppositely arranged in the discharge space, and the discharge electrode contains the mayenite type compound.

3. The fluorescent lamp according to claim 1, wherein the mayenite type compound is $12CaO.7Al_2O_3$ compound, $12SrO.7Al_2O_3$ compound, mixed crystal compounds thereof, or compounds of same type of those compounds.

4. The fluorescent lamp according to claim 1, wherein a part of Al contained in the mayenite type compound is substituted with Si, Ge, B or Ga.

5. The fluorescent lamp according to claim 1, wherein at least a part of free oxygens constituting the mayenite type compound is substituted with electrons, and the mayenite type compound has an electron density of $1 \times 10^{15}$ cm$^{-3}$ or more.

6. The fluorescent lamp according to claim 1, wherein at least a part of free oxygens constituting the mayenite type compound is substituted with anions of atoms having electron affinity smaller than that of the free oxygens.

7. The fluorescent lamp according to claim 1, wherein the discharge gas contains at least one element selected from the group consisting of He, Ne, Ar, Kr and Xe.

8. The fluorescent lamp according to claim 2, wherein the mayenite type compound is $12CaO.7Al_2O_3$ compound, $12SrO.7Al_2O_3$ compound, mixed crystal compounds thereof, or compounds of same type of those compounds.

9. The fluorescent lamp according to claim 2, wherein a part of Al contained in the mayenite type compound is substituted with Si, Ge, B or Ga.

10. The fluorescent lamp according to claim 2, wherein at least a part of free oxygens constituting the mayenite type compound is substituted with electrons, and the mayenite type compound has an electron density of $1 \times 10^{15}$ cm$^{-3}$ or more.

11. The fluorescent lamp according to claim 2, wherein at least a part of free oxygens constituting the mayenite type compound is substituted with anions of atoms having electron affinity smaller than that of the free oxygens.

12. The fluorescent lamp according to claim 2, wherein the discharge gas contains at least one element selected from the group consisting of He, Ne, Ar, Kr and Xe.

13. The fluorescent lamp according to claim 1, wherein the fluorescent lamp is a cold cathode fluorescent tube.

14. The fluorescent lamp according to claim 1, wherein the discharge electrode comprises a cup and a lead wire, the cup has a cylindrical shape and the end thereof has a conical shape, and the mayenite type compound is contained in the cup and the lead wire, and is a part of a material constituting those.

15. The fluorescent lamp according to claim 14, wherein the cup is electrically connected to the lead wire at the end thereof by welding.

16. The fluorescent lamp according to claim 14, wherein a layered mayenite type compound is arranged on an inner wall of the cup.

17. The fluorescent lamp according to claim 14, wherein the cup is a hollow metal made cylinder, and the cup is covered with the mayenite type compound.

18. The fluorescent lamp according to claim 1, wherein the discharge electrode is exposed to plasma, whereupon the mayenite type compound is converted to conductive mayenite.

19. The fluorescent lamp according to claim 18, wherein the plasma is a discharge plasma generated in a rare gas.

20. The fluorescent lamp according to claim 18, wherein the discharge electrode is exposed to plasma in a plasma treatment using plasma generated by glow discharge.

* * * * *